United States Patent [19]

Kraus et al.

[11] Patent Number: 4,710,204
[45] Date of Patent: Dec. 1, 1987

[54] POLYPHOSPHAZENE GAS SEPARATION MEMBRANES

[75] Inventors: Menahem A. Kraus, St. Louis; Milton K. Murphy, St. Charles, both of Mo.

[73] Assignee: Monsanto Company, St. Louis, Mo.

[21] Appl. No.: 566,244

[22] Filed: Dec. 28, 1983

[51] Int. Cl.$^4$ ............................................. B01D 53/22
[52] U.S. Cl. ............................................. 55/16; 55/78; 55/158
[58] Field of Search ............................ 55/16, 73, 158; 210/500.2; 528/399, 400

[56] References Cited

U.S. PATENT DOCUMENTS

| | | | |
|---|---|---|---|
| 3,271,330 | 9/1966 | Evans | 528/399 |
| 3,515,688 | 6/1970 | Rose | 528/399 |
| 3,838,073 | 9/1974 | Rose et al. | 528/399 |
| 3,844,983 | 10/1974 | Reynard et al. | 528/399 |
| 3,896,058 | 7/1975 | Reynard et al. | 528/399 |
| 3,945,966 | 3/1976 | Vicic et al. | 528/399 X |
| 4,124,557 | 11/1978 | Dieck et al. | 528/399 X |
| 4,214,020 | 7/1980 | Ward et al. | 55/158 X |
| 4,220,535 | 9/1980 | Leonard | 55/158 X |
| 4,230,463 | 10/1980 | Henis et al. | 55/158 X |
| 4,238,204 | 12/1980 | Perry | 55/16 |
| 4,242,492 | 12/1980 | Hergenrother et al. | 528/399 X |
| 4,242,493 | 12/1980 | Cheng et al. | 528/399 X |
| 4,242,494 | 12/1980 | Hergenrother et al. | 528/399 X |
| 4,247,679 | 1/1981 | Hergenrother et al. | 528/399 X |
| 4,247,680 | 1/1981 | Hergenrother et al. | 528/399 X |
| 4,255,591 | 3/1981 | Makin et al. | 55/16 X |
| 4,279,723 | 7/1981 | Osada et al. | 528/399 X |
| 4,357,458 | 11/1982 | Antkowiak et al. | 528/400 X |
| 4,367,135 | 1/1983 | Posey, Jr. | 55/16 X |

FOREIGN PATENT DOCUMENTS 2343164  3/1974  Fed. Rep. of Germany ...... 528/399

OTHER PUBLICATIONS

Bittirova et al., Vysokomol. Soedin, Ser. B, 23(1), 30–33, (1980).
Kireyev et al., Vysokomol. Soedin, Ser. A, 18(1), 228, (1976).
Chattopadhyay et al. J., Coating Technology, 51(658), 87, (1979).

Primary Examiner—Robert Spitzer
Attorney, Agent, or Firm—Henry Croskell

[57] ABSTRACT

Polyphosphazenes are disclosed as gas separation membranes which exhibit effective preferential selectivity and permeabilities for acid gases relative to non-acid gases contained in feed gas stream mixtures, particularly where the acid gases are mixed with gaseous hydrocarbons. The polyphosphazenes are rubbery polymers having attractive acid gases transport properties and improved thermal and chemical stability. Processes utilizing polyphosphazene membranes for separating acid gases from gasous mixtures containing non-acid gases are also disclosed.

2 Claims, No Drawings

POLYPHOSPHAZENE GAS SEPARATION MEMBRANES

BACKGROUND OF THE INVENTION

This invention relates to gas separation membranes comprised of polyphosphazene polymers and processes utilizing such membranes for selectively separating acid gases from non-acid gas mixtures by permeation.

The separating, including upgrading or the concentration of at least one selective gas from a gaseous mixture, is an essentially important procedure in view of demands on the supplies of chemical feedstocks. Frequently these demands are met by separating one or more desired gases from gaseous mixtures and utilizing the gaseous product for processing. Applications have been made employing separation membranes for selectively separating one or more gases from gaseous mixtures. To achieve selective separation, the membrane exhibits less resistance to transport of one or more of the gases than of at least one other gas in the mixture. Thus, selective separation can provide preferential depletion or concentration of one or more desired gases in the mixture with respect to at least one other gas and, therefore, provide a product having a different proportion of the one or more desired gases to at least one other gas than the proportion in the feed mixture. However, in order for selective separation of the one or more desired gases by the use of separation membranes to be commercially attractive, the membranes must satisfy several criteria so that the use of the separation procedure is economically attractive. For instance, the membranes must be capable of withstanding the conditions to which they may be subjected during the separation operation. The membranes also must provide an adequately selective separation for one or more desired gases at a sufficiently high flux, that is, permeation rate of the permeate gas per unit surface area. Thus, separation membranes which exhibit adequately high selective separation but undesirably low fluxes, may require such large separating membrane surface area that the use of these membranes is not economically feasible. Similarly, separation membranes which exhibit a high flux but low selective separation are also commercially unattractive. Accordingly, work has continued to develop gas separation membranes which can provide both an adequately selective separation of one or more desired gases such as acid gases from non-acid gases at a sufficiently high flux for an extended period of time under adverse environmental conditions such that the use of these gas separation membranes is economically feasible.

In general, the passage of a gas through a membrane may proceed through pores, i.e. continuous channels for fluid flow in communicational at both feed and exit surfaces of the membrane which pores may or may not be suitable for separation by Knudsen flow and diffusion; in another mechanism, in accordance with current views of membrane theory the passage of a gas through the membrane may be by interaction of the gas with the material of the membrane. In this latter postulated mechanism, the permeability of a gas through a membrane is believed to involve solubility of the gas in the membrane material and the diffusion of the gas through the membrane. The permeability constant for a single gas is presently viewed as being the product of the solubility and diffusivity of the gas in the membrane. A given membrane material has a particular permeability constant for passage of a given gas by the interaction of the gas with the material of the membrane. The rate of permeation of the gas, i.e. flux, through the membrane is related to the permeability constant, but is also influenced by variables such as membrane thickness, partial pressure differential of the permeate gas across the membrane, the temperature and the like.

Polymers useful as practical membranes for gas separation applications must satisfy a number of stringent criteria. Foremost among requirements are the polymers intrinsic transport properties such as permeability and selectivity. Additional requirements include adequate thermal and chemical-environmental stability and appropriate properties such as solubility characteristics which are crucial to the fabrication of the polymers into useful membranes. At present, most polymers which have been utilized for gas separations belong to the general family known as glassy polymers. For the most part, these materials are attractive because they satisfy very well the above criteria for fabrication into useful membranes in the asymmetric morphology either as film or hollow fiber. However, many polymers which satisfy fabrication criteria possess transport properties which are less than ideal for a given separation application. Frequently polymers which exhibit a desirably high selectivity for a particular gas pair do not allow the faster gas to permeate at an adequate rate. Conversely, polymers with very high permeabilities for a given gas, often are only moderately selective. It is a difficult task to find a single material which will simultaneously satisfy most or all of the necessary requirements for the desired gas separations.

Glassy polymers are generally highly amorphous materials, which are, as their name implies, in a frozen state at ambient temperatures. Above the glassy transition temperature or $T_g$ of the polymer, the glassy solid changes into another amorphous solid state, a rubber which then is characterized by much more rapid motion on the molecular scale of the polymer chains. Of particular interest among the various properties which distinguish polymers in the rubbery state versus the glassy state is that the transport properties are often drastically different for the two types of materials. Permeabilities for gases through many rubbers are very high compared to permeabilities of the same gases in many glassy polymers. However, the more dynamic nature of the polymer chains in the rubbery state, which is generally responsible for the higher permeabilities, often causes much lower selectivities for rubbery polymers as compared to many glassy polymers. In addition, many rubbery polymers do not possess an appropriate combination of other properties required for efficient fabrication into membranes having the preferred asymmetric morphology.

Some rubbery polymers have been and are being used in gas separations. Silicone rubbers have been applied to air ($O_2/N_2$) separations, particularly for small scale uses such as blood oxygenation or air oxygen enrichment. In such a circumstance, it is the very high $O_2$ permeability of silicone rubbers which outweights less attractive properties, such as low selectivity and mechanical weakness. Since the silicone rubbers cannot readily be made in asymmetric form, the polymer is supported typically on a relatively strong porous support. Such porous supports can in appropriate applications effectively circumvent a rubbery polymer's limitations regarding fabrication and mechanical strength. For large scale gas separation applications of potential commercial importance, it remains, however, that the usually inadequate selectivity characteristics of most rubbery polymers limit their practical utility.

Polyphosphazenes are polymers having a phosphorous-nitrogen sequence with organic substituents on the phosphorous as follows:

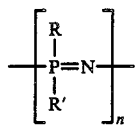

where R and R' are the same or different organic substituents and n is an integer of ten or more.

A limited number of single gas transport measurements of polyphosphazenes has been made. For instance, Bittirova, et al, Vysokomol. Soedin, Ser. B, 23(1), 30-3 (1980) discloses the permeability to oxygen, nitrogen and argon of poly(octyloxy phosphazene). The Bittirova, et al reference focuses on one polyphosphazene with particular interest in the material because of its "specific properties" including the translucent, flexible, elastic films having permeability coefficient values for $O_2$, Ar, $N_2$ of $12.84 \times 10^{-7}$, $11.88 \times 10^{-7}$ and $5.25 \times 10^{-7}$, $cm^3.cm/cm^2.s.atm$, respectively. The reference makes no attempt to qualify the elastic films further with regard to other gas transport properties.

Kireyev et al, Vysokomol. Soedin, Ser. A18(1), 228 (1976) and Chattopadhyay, et al, J. Coating Technology, 51 (658), 87 (1979) disclose water vapor permeability in poly(butyloxy phosphazene) and in poly(aryloxy phosphazenes) respectively. Kireyev, et al discusses the need for new types of elastomers; thus, the interest in polydiogano phosphazenes (one of the qualifying physical property studies relates to the absorption of steam by these phosphazenes as examined gravimetrically). Chattopadhyay, et al provides a publication entitled "Polyphosphazenes As New Coating Binders" with special interests in the polyaryloxy phosphazenes as a material having a high degree of flame retardancy and other desirable polymeric properties for application as paint binders. The Chattopadhyay, et al reference along with other physical test evaluations indicate moisture vapor transmission through the polymeric film at 25° C. No mention of the separation of a gas mixture by polypnophazene membranes has been made.

In summary, suitable polyphosphazene gas separation membranes have not been provided. Particularly, the suitability of polyphosphazene gas separation membranes for separation of acid gases from non-acid gases has not been suggested.

SUMMARY OF THE INVENTION

The present invention provides polyphosphazene gas separation membranes which exhibit effective preferential selectivity and permeabilities for acid gases relative to non-acid gases contained in a feedstream mixture. The polyphosphazene gas separation membranes are comprised of rubbery polymers having attractive acid gas transport properties and improved thermal and chemical stability. Polyphosphazenes which are suitable according to the present invention are polymers whose backbone consists of phosphorous nitrogen sequence with organic substituents on the phosphorous: preferred constituents being substituted alkoxy, aryloxy and substituted aryloxy. The polyphosphazene gas separation membranes can have various configurations or be in the form of a dense film. Due to the rubbery nature of polyphosphazene membranes, suitable gas separation membrane structures will often utilize the polyphosphazenes as a supported coating on a porous substrate. In addition polyphosphazenes can be applied as coating material in contact with a porous separation membrane which contributes to the separation properties of the resulting multicomponent membrane. The present invention is also directed to processes utilizing polyphosphazene membranes for separating acid gases from gaseous mixtures containing non-acid gases as, for example, gaseous hydrocarbons.

DEFINITION OF TERMS

In the description of the present invention the following definitions are used.

The term "membrane" as used in this application refers to material having surfaces which can be contacted with a fluid and/or gas mixture such that one fluid or gas of the mixture selectively permeates through the material. Such membrane can generally be disposed in film- or hollow fiber- form. Membranes can be porous, or essentially pore-free, or have layers that are porous and layers that are essentially pore-free. This invention provides membranes exhibiting advantageous gas separation properties for acid gases. However, the membranes of this invention will exhibit useful and advantageous fluid and/or gas separation properties other than for acid gases.

The term "dense", or "dense film", membranes as used in this application means membranes which are essentially free of pores, i.e., fluid channels communicating between surfaces of the membrane, and are essentially free of voids, i.e. regions within the thickness of the membrane which do not contain the material of the membrane. Since a dense membrane is essentially the same throughout the structure, it falls within the definition of isotropic membrane. Although some thick membranes are very selective, one of their disadvantages is low permeate flux due to the relatively large thicknesses associated with membranes. Dense membranes are useful in determining intrinsic gas separation properties of a material. Intrinsic separation properties include separation factor $\alpha$, and permeability constant, P, both of which are defined below.

The term "asymmetric" or "anisotropic" membranes as used in this application means membranes which have a variable porosity across the thickness of the membrane. Exemplary of an asymmetric membrane is what is called the Loeb membrane, which is composed of two distinct regions made of the same material, that is, a thin dense semi-permeable skin and a less dense, void-containing support region. However, an asymmetric membrane does not necessarily have the thin dense semi-permeable region on an outer surface or skin.

The membranes of this invention comprise materials in film- or hollow fiber- form which have particular separation relationships. Some of these relationships can conveniently be stated in terms of relative separation factors with respect to a pair of gases for the membranes. A separation factor ($\alpha a/b$) for a membrane for a given pair of gases (a) and (b) is defined as the ratio of the permeability constant ($P_a$) for the membrane for a gas (a) to the permeability constant ($P_b$) of the membrane for gas (b). The permeability for a given gas is the volume of gas at standard temperature and pressure (STP), which passes through a membrane per square centimeter of surface area, per second, for partial pressure drop of one centimeter of mercury across the membrane per unit of thickness, and is expressed in units of (P=cm³-cm/cm²-sec-cmHg). A separation factor is also equal to the ratio of permeability $(P/1)_a$ of a membrane of thickness (1) for a gas (a) of a gas mixture to the permeability of the same membrane for gas (b), $(P/1)_b$ (P/1=cm³/cm²-sec-cmHg).

In practice, the separation factor with respect to a given pair of gases for a given membrane can be determined employing numerous techniques which provide sufficient information for calculation of permeability constants or permeabilities for each of the pair of gases. Techniques available for determining permeability constants, permeabilities, separation factors are disclosed by Hwang, et al "Techniques of Chemistry, Vol. VII, Membranes In Separations, John Wiley & Son (1975) (herein incorporated by reference at Chapter 12, pages 296-322.

"Polyphosphazenes" as used in this application represent a composition of matter having a repeating structural unit of the formula:

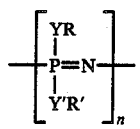

where Y and Y' can be the same or different and selected from oxygen, nitrogen or sulfur and where R and R' can be the same or different and selected from substituted alkyl, aryl, and substituted aryl, alkyl, and n is an integer of from about 100 to about 70,000. Preferred polyphosphazenes are substituted alkoxy, aryloxy and substituted aryloxy groups wherein the R and R' can be the same or different and contain from 1 to about 25 carbon atoms.

The term "crosslinked polymer" as used in this application means that polymer chains of polyphosphazene are bonded to one another. The fact that the polymer is stable, that is, does not dissolve in solvents for polyphosphazene is indictive of crosslinking.

DESCRIPTION OF A PREFERRED EMBODIMENT

This invention provides gas separation membranes comprising polyphosphazene as homo- and copolymers as well as mixtures of polyphosphazenes as the material for acid gas separation membranes. Gas transport and separation properties of a variety of polyphosphazenes have been found to be highly selective and permeable for acid gases such as $H_2S$ and $CO_2$ from a gas stream containing, for example, $H_2S$, $CO_2$ and $CH_4$. Polyphosphazenes in general have exhibited preferential selectivities and permeabilities for acid gases from hydrocarbon gaseous streams; however, substituted alkoxy and aryloxy polyphosphazenes provide enhanced acid gas recovery beyond the other polyphosphazenes discussed. For example, halogen substituted alkoxy polyphosphazenes are the preferred substituents with most preferred being highly fluorine substituted materials.

FORMATION OF POLYPHOSPHAZENES

Polyphosphazenes can be synthesized to give soluble, high molecular weight (often greater than one million), linear chain material. Thermal polymerization of trimeric cyclo-phosphonitrylic chloride monomer yields a high molecular weight (—PN—) skeleton which has two chlorines on each phosphorous. This poly(dichloro)phosphazene is the base polymer from which all the soluble polyphosphazene rubbers were made by subsequent nucleophilic displacement reactions. Typically, the sodium salt of an alcohol is used to displace chlorine on phosphorous and substitute the —O—R group in its place, as shown below:

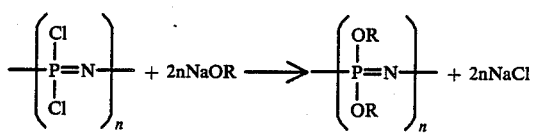

Copolymers are synthesized by using a mixture of alcoholate salts. Nitrogen rather than oxygen containing side groups linked to the phosphorous backbone atoms are made by use of amines in place of Na-OR salts in an exchange reaction. Typically polyphosphazenes with —OR side groups on the phosphorous are more thermally and chemically stable for example, to hydrolysis, than those with $—NR_2$ groups.

Gas separation membranes comprised of polyphosphazenes have been found to possess unexpectedly attractive combinations of permeability and selectivity for acid gas separations and indications are that these polyphosphazenes also have significantly better thermal and chemical stability than many rubbery polymers. Our gas transport properties and physical/chemical properties of halogenated polyphosphazenes indicate that this class of rubbery polymers has significant potential for utility in practical acid gas separations on a large scale. Especially noteworthy are the $CO_2$ and $H_2S$ permeabilities and their separation from methane streams utilizing halogenated polyphosphazenes. The poly(fluoro-alkoxy) polyphosphazenes exhibited very high permeabilities for $CO_2$ which are accompanied by unexpectedly high $CO_2/CH_4$ separation factors found to be in the range of 10 to 12. Comparison of test results for $CO_2$ and $H_2S$ transport for the poly(fluoro-alkoxy) phosphazenes with permeability values for other gases, including hydrogen, oxygen and nitrogen clearly indicates that the acid gases as permeants exhibit very high permeabilities in the fluoro-alkoxy substituted polyphosphazenes. In contrast with glassy polymers, where hydrogen normally permeates at about twice the intrinsic rate of carbon dioxide, the poly(fluoro-alkoxy) phosphazenes have carbon dioxide and hydrogen sulfide permeabilities of about five times that of hydrogen.

The various polyphosphazenes utilized for gas separation membranes are rubbery materials with $T_g$ well below room temperature. These polyphosphazenes are soluble generally in polar organic solvents such as tetrahydrofuran (THF), methanol, acetone, ethyl acetate, methylethylketone (MEK), dimethylformamide (DMF), dimethylacetone (DMAC), formyl piperidine, N-methyl pyrrolidone and the like. Polyphosphazenes having aryl side groups are also soluble in aromatic hydrocarbons, such as toluene and benzene. The latter solvents have little swelling impact on polyphosphazenes which have been halogenated on the alkyl side groups. While the poly(fluoro-alkoxy)phosphazenes are readily soluble in methanol, these phosphazenes are only sparingly soluble in high alcohols, for example, less than one percent in isopropyl alcohol at up to about 70°

C. Various polyphosphazenes were evaluated as gas separation membranes including those with side groups comprised of substituted alkoxy, aryloxy and substituted aryloxy as well as copolymers thereof, for example, poly(bis-phenoxy)phosphazene; copoly(phenoxy, p-ethyl phenoxy)phosphazene; poly(bis-trifluoroethoxy)phosphazene and the like. A copolymer phosphazene with fluorinated alkoxy side groups on the chain backbone of phosphorous atoms was evaluated with results related to those results produced with poly(bis-trifluoroethoxy) phosphazene. Overall side group composition of the mixed perfluorinated alkoxy copolymer was about 65% —O—$CH_2$—$CF_3$, about 35% —O—$CH_2$—$(CF_2)_n$—$CHF_2$, where n is equal to 1, 3, 5, 7, 9; the copolymer also containing 0.5 unsaturated functionality in the side groups, which can be crosslinked by various vulcanizing agents such as peroxides or sulfur.

Supported polyphosphazene gas separation membranes according to the invention were obtained by multiple coatings onto porous filter supports. Typically, 6 to 10% by weight tetrahydrofuran (THF) solution of the polyphosphazenes was applied to the surface of disk of regenerated cellulose filters (0.2 micron pore size). Vacuum was applied to remove the solvent. Then the coating/drying procedure was repeated typically 3 to 7 times until a relatively thick uniform membrane of the polyphosphazene polymer was obtained. Membrane thickness were obtained by two methods: by direct micrometer measurement, substracting the uncoated cellulose support thickness from the total thickness of the coated support and by use of the weight gain following coating, taking the polyphosphazene density and membrane area into account. Thicknesses obtained by the two methods agreed to within about 10%. Thickness values obtained from weight gain/density/area calculations were used, since these values would be expected to include any material which might have impregnated pores in the cellulose filter support. Membrane thicknesses were typically about 0.02 cm. or lower.

Gas separation testing followed conventional procedures of Hwang, et al, employing mixed gases. Due to the high gas flux rates encountered in test of the polyphosphazene materials, most data was obtained at feed gas pressure of 10 to 20 psig. The downstream side of the test membranes was under vacuum. Some high pressure feed tests were evaluated when the mixed gas feedstream was under pressure of 100 to about 300 psig. All tests reported were evaluated at room temperature.

Gas separation results obtained through use of four different polyphosphazenes as supported membranes for non-acid gases are presented in Table 1. Separation performance of the four polyphosphazene membranes for acid gases, for example, $CO_2$ and $H_2S$ is illustrated by the data in Table II. Table II data also presents comparisons for the separating performance of polyphosphazenes for $CH_4$ and $CO_2$. In Table III are displayed comparisons of hydrogen and carbon dioxide permeability and hydrogen/methane and carbon dioxide/methane separation factors for a variety of membranes, both rubbery and glassy materials. Of particular interest, the data illustrates unexpected positive and attractive behavior for the acid gas permeability, and acid gas/methane selectivity for polyphosphazenes which bear fluorinated alkoxy side groups. These polymers, poly(bis-trifluoroethoxy)phosphazene and copolymers of various fluorinated alkoxy side groups, both exhibit an unusual and attractive combination of permeability (400–600 cc-cm/$cm^2$-sec-cmHg) and selectivity (10–11.5) properties for acid gas separations from methane. Such high carbon dioxide permeabilities are exceeded only by silicon-based polymers. For example, polydimethylsiloxane is reported having as high as 3,000 to 4,000 standard units for carbon dioxide permeability; however, the separation factors for carbon dioxide/methane are considerably lower, for example, 3 to 4. While many glassy polymers exhibit higher carbon dioxide/methane selectivities [about 30 for polysulfone and 35–50 for ammonia crosslinked brominated polyphenylene oxide (PPO, for example, 2,6-dimethyl-1,4-phenylene oxide)], $CO_2$ permeability is typically lower by one or two orders of magnitude, for example, about 6 for polysulfone and about 40 to 45 for the crosslinked brominated PPO membranes. Measurements indicate that hydrogen sulfide permeability for the fluoro-alkoxy substituted polphosphazenes is about equal to that of carbon dioxide.

TABLE I

| | Non-Acid Gas Transport Properties of Polyphosphazenes ($H_2$, $CH_4$, CO, $O_2$, $N_2$) | | | | | |
|---|---|---|---|---|---|---|
| Membrane | Polymer | $P_{H_2}$ ($\times 10^{-10}$) | $H_2$ $\alpha CH_4$ | $H_2$ $\alpha CO$ | $P_{O_2}$ ($\times 10^{-10}$) | $O_2$ $\alpha N_2$ |
| 1. | Poly(bis-trifluoroethoxy) phosphazene | 90.–100. | 1.6–1.9 | 2.0–2.1 | 83.–89. | 2.0–2.1 |
| 2. | Poly(fluoro-alkoxy) phosphazene | 80.–90. | 1.3 | 2.0 | 72. | 1.7 |
| 3. | Poly(bis-diphenoxy) phosphazene | 9. | 2.4 | — | 4. | 3.6 |
| 4. | Copoly (phenoxy, p-ethylphenoxy) phosphazene | 12.–14. | 2.4–2.5 | 5. | 5.4–5.6 | 3.4 |

TABLE II

| | Acid Gas Transport Properties of Polyphosphazenes $CH_4$, $CO_2$, $H_2S$ | | | | |
|---|---|---|---|---|---|
| Membrane | Polymer | $P_{CO_2}$ ($\times 10^{-10}$) | $CO_2$ $\alpha CH_4$ | $P_{H_2S}$ ($\times 10^{-10}$) | $CO_2$ $\alpha H_2S$ |
| 1. | Poly(bis-trifluoroethoxy) phosphazene | 550.–600. | 10.–11.3 | 550. | 1. |
| 2. | Poly(fluoro-alkoxy) phosphazene | 400. | 11.–11.5 | — | — |
| 3. | Poly(bis-diphenoxy) | 76. | 6.6–7.0 | — | — |

TABLE II-continued

Acid Gas Transport Properties of Polyphosphazenes
$CH_4$, $CO_2$, $H_2S$

| Membrane | Polymer | $P_{CO_2}$ ($\times 10^{-10}$) | $\alpha^{CO_2}_{CH_4}$ | $P_{H_2S}$ ($\times 10^{-10}$) | $\alpha^{CO_2}_{H_2S}$ |
|---|---|---|---|---|---|
| 4. | phosphazene Copoly (phenoxy, p-ethylphenoxy) phosphazene | 36.–39. | 6.4–6.9 | — | — |

TABLE III

Comparison of Gas Transport Properties for Various Glassy and Rubbery Polymers

| Membrane | Rubbery Polymers | $P_{H_2}$ ($\times 10^{-10}$) | $\alpha^{H_2}_{CH_4}$ | $P_{CO_2}$ ($\times 10^{-10}$) | $\alpha^{CO_2}_{CH_4}$ | Calculated $\alpha^{CO_2}_{H_2}$ |
|---|---|---|---|---|---|---|
| 1. | Polydimethylsiloxane | 650. | 0.68 | 3,250. | 3.4 | 5. |
| 2. | Poly(bis-trifluoroethoxy)phosphazene | 100. | 1.8 | 550.–600. | 10.–11. | 5.5–6. |
| 3. | Copoly(fluoro-alkoxy)phosphazene | 85. | 1.3 | 400. | 11.–11.5 | 4.7 |
| 4. | Polychloroprene | 14. | — | 26. | — | 1.8 |
| 5. | Polyisoprene (density 0.9689) | 51. | 1.8 | 134 | 4.6 | 2.6 |
| 6. | Poly(bis-phenoxy)phosphazene | 9. | 2.4 | 76. | 6.6–7.0 | 8.4 |
| 7. | Poly(dimethyl, p, phenylene oxide), PPO | 100.–120. | 30. | 75. | 18.–21. | 0.63–0.75 |
| 8. | Copoly(phenoxy, p-ethylphenoxy)phosphazene | 12.–14. | 2.4–2.5 | 36.–39. | 6.4–6.9 | 2.5–3.3 |
| 9. | Ammonia Crosslinked Brominated polyphenylene Oxide | 22. 110. 23. | 53.–55. 34. 152. | 8.–9. 42. 9. | 21.–22. 35. 47. | 0.36–0.41 0.38 0.39 |
| 10. | Cellulose triacetate | 10.–11. | 80. | 5.–6. | 30.–33. | 0.45–0.6 |
| 11. | Polysulfone | 8.–10. | 60.–70. | 4.–6. | 27.–31. | 0.4–0.6 |

It appears that polyphosphazene membranes interact in some unusual manner with acid gases to account for the transport behaviors observed. In particular, the poly(fluoro-alkoxy) phosphazenes must interact in some manner with $CO_2$ and $H_2S$. An additional experiment was made by using a three-component mixed gas feed of $H_2S/CO_2/CH_4$ at 20 psig for a membrane of poly(bis-trifluoroethoxy)phosphazene supported on a porous polypropylene filter (0.02 micron pore). The results indicated that $CO_2/CH_4$ permeation behavior was very similar to that observed previously in the absence of $H_2S$, indicating generally that the membrane itself was intact. However the $H_2S/CO_2$ separation factor is essentially unity. Thus, while the poly(fluoro-alkoxy)-phosphazenes hold little attraction for separation of acid gas pairs, such as $H_2S/CO_2$ they find utility in gas mixtures where the desired separation is that of $CO_2$ or $H_2S$ from gaseous hydrocarbons or other non-acid gases.

The permeability of $CO_2$ in poly-(fluoro-alkoxy)phosphazenes was significantly higher than the permeabilities for the same membrane for hydrogen. Although mixed gases such as $CO_2$/hydrogen tests have not been made, the present data suggests that $CO_2$/hydrogen separation factors for poly(bis-trifluoroethoxy)phosphazenes and various phosphazene mixtures would be about 5 to 6. Generally, in the case of glassy polymers hydrogen permeability is observed to be roughly twice that of carbon dioxide. In some rubbery polymers, carbon dioxide permeates faster than hydrogen, for example, silicon rubber has been reported to have intrinsic permeabilities for $CO_2$ and $H_2$ of 3200 and 660 standard units respectively. These values for silicones suggest $CO_2/H_2$ separation factor of about 5, comparable to the above estimates for the poly(fluoro-alkoxy)phosphazenes. Thus, the poly(halo-alkoxy)phosphazenes may find utility in separations of gas pairs which, at least in the case of most glassy polymers, would be termed fast gases. For example, potential value may exist in situations where it is desirable to affect separation of acid gases, i.e. $CO_2$ and $H_2S$ from $H_2$.

Included in Table III are calculated values for $CO_2/H_2$ separation factors, based solely on ratios of $CO_2$ and $H_2$ permeability values obtained from $CO_2$/methane and $H_2$/methane mixed gas test.

The ability to make practical use of the attractive intrinsic transport properties for acid gases using poly-halogenated alkoxy phosphazenes, or any other rubbery polymer in the form of gas separation membranes would at first sight seem limited largely by the poor mechanical properties of the rubbery state compared to the high mechanical strength typically found for glassy polymers. However, technology exists for effectively supporting thin rubbery polymer membranes in configurations suitable for gas separations. For example, ultra-thin approximately 500 Å silicon based rubbery membranes supported atop porous supports have been fabricated into small scale medical devices suitable for blood oxygenation or production of oxygen enriched air. Studies of the polyphosphazenes as gas separation membranes have lead to the possibility of effectively supporting very thin separation membranes of a wide variety of polymers, including rubbery materials such as polyphosphazenes atop microporous supports in hollow fiber configurations. For example, experimentation at supporting poly(bis-trifluoroethoxy) phosphazene atop microporous polypropylene hollow fibers has yielded composite fiber membranes approaching the intrinsic separation factor of the polymer for $CO_2/CH_4$ (8.3 versus intrinsic 10.5). This result indicates that very nearly complete integrity of the polyphosphazene separating layer was achieved. Permeability, (P/l), of $CO_2$ of this particular sample was 83 (P/l) by comparison to the intrinsic permeability of $CO_2$ of about 600(p) for the particular polyphosphazene; thus allowing the estimate that the thickness of the supported polyphosphazene membrane as 7.5 microns. At a thickness at about 2 microns, the P/l of $CO_2$ could be obtained at about the 300 standard unit level or above.

Apart from the attractive transport properties of the polyhaloalkoxy polyphosphazene described above, these materials also possess high thermal and chemical stability, which may broaden their utilization in various gas separation applications. For example, differential scanning calorimetry of these polyphosphazenes over a temperature extending from $-100°$ to $300°$ C., has shown no thermal activity other than the glass to rubber phase transition $T_g$ which is observed near $-60°$ C. These polyphosphazene materials possess substantial resistance to degradation by common solvents and other organics which may be encountered in some gas separation applications. For example, at room temperature in liquid toluene, silicone rubber swells 140 volume percent while a polyphosphazene mixture swells only about 15%. After immersion at 100° C. for seven days in JP4 jet fuel (kerosene fraction hydrocarbons) the polyphosphazene mixture had swelled only about 9% of volume; thus the earlier interest in polyphosphazenes in the area of specialty O-ring and gasket applications.

Further examples of the unique stability features of polyphosphazene materials are found in the comparison of the hot tensile strength of polyphosphazene mixtures to that of fluorosilicone elastomers. While fluorosilicone elastomers exhibit a relatively low equilibrium swelling upon immersion in liquid toluene at room temperature (about 20% versus about 15% for polyphosphazenes), tensile strength retention of the polyhosphazenes is considerably better at elevated temperatures, for example, equal to or greater than 50% retention at 150° C. for the polyphosphazenes versus only about 25% retention for the fluorosilicone. It is expected that the polyphosphazene gas separation membranes would have an upper limit to prolonged exposure to temperatures of up to about 175° C.; however, these upper temperatures are beyond the upper limit of surface temperatures generally contemplated either in gas separation membrane fabrication or gas separation applications.

As attractive as the above described transport and physical/chemical properties of the polyphospazenes are, the ability to crosslink the unsaturated fluorinated polyphosphazenes further enhances the polymers' potential utility in acid gas separations. Thus, crosslinked polyphosphazenes would provide applications involving aggressive use environments e.g., feestreams containing solvating components or swelling impurity components or elevated temperature environments. The crosslinking of various poly(fluoro-alkoxy)phosphazenes may be accomplished to various extents as may be desired, by treatment of the polyphosphazene with, for example, the disodium salt of highly fluorinated alkyl diols. Such crosslinking reactions in solution may be readily accomplished under mild room temperature conditions and occur to an extent closely related to the stoichiometric ratio of reactants. Crosslinking may also be performed on polyphosphazene in the solid state. In such case, higher temperatures are normally required compared to solution crosslinking. Crosslinking, as described above by the displacement-exchange reaction effected with fluorinated disodium dialkoxides, can be carried out in much higher crosslink densities than could crosslinking reactions employing peroxide or other free radical agents wherein the starting polyphosphazene materials have small amounts of unsaturated sites. Thus, with the information available and as derived from present testing, polyphosphazenes have sufficient physical properties for potential utility in a variety of gas separation applications. Potential uses include separations of the acid gases such as $CO_2$ and $H_2S$ from $H_2$ and slow gases, particularly $CH_4$. For such separation applications the transport properties of polyphosphazenes appear to offer distinct advantages in terms of their combination of permeability and selectivity as compared to various rubbery and glassy polymers.

Permeability of gases of rubbery polymers, unlike that in glassy polymers, is essentially independent of pressure. This follows from the relationship: $P = D \times S$, where P, D and S are the permeability, diffusivity and solubility coefficients for the gas in the polymer. Gas solubility in rubbery polymers follows Henry's Law, thus the solubility coefficients are pressure independent, as is the diffusivity coefficient D. Therefore gas support properties at high pressures should not be too different from those at low pressures. In order to minimize performance degradation, operation at elevated temperatures is frequently employed to raise the saturation vapor pressure of harmful contaminants sufficiently so as to lower the relative saturation level as much as practical. Conceivably due to the high permeabilities, and good chemical resistance of polyphosphazenes as gas separation membranes, high temperatures operation would not be necessary. In such a case, the effectiveness of the separation would depend on the adequacy of chemical resistance exhibited by the porous support in the case of a composite membrane utilizing polyphosphazenes as the coating.

We claim:

1. A process for separating acid gases from non-acid gases comprising:

contacting a gaseous feed mixture of acid gases and non-acid gases with a first surface of a separation membrane comprising polyphosphazenes having a preferential selectivity and permeability for the acid gases and represented by the formula:

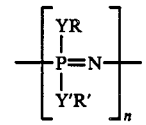

where n is between about 100 and about 70,000; where Y and Y' are the same or different and are comprised of oxygen, sulfur or nitrogen; R and R' are the same or different and are comprised of alkyl, aryl, substituted alkyl, or substituted aryl groups, each group having from 1 to about 25 carbon atoms;

maintaining a second surface of the polyphosphazene membrane at a lower chemical potential for the acid gases than the chemical potential at the first surface;

permeating the acid gases into and through the polyphosphazene membrane; and removing from the vicinity of the second surface a permeated product having a greater concentration of acid gases relative to non-acid gases than contained in the gaseous feed mixture.

2. The process for separating acid gases from non-acid gases according to claim 1 wherein the acid gases are comprised of $CO_2$ and $H_2S$ and the non-acid gases are comprised of gaseous hydrocarbons having from 1 to about 3 carbon atoms per molecule.

* * * * *